United States Patent
Ko et al.

(10) Patent No.: US 9,632,767 B2
(45) Date of Patent: Apr. 25, 2017

(54) METHOD AND APPARATUS TO DEVELOP AN APPLICATION OF AN IMAGE FORMING APPARATUS

(75) Inventors: Chang-gun Ko, Suwon-si (KR); Nam-su Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 379 days.

(21) Appl. No.: 13/484,706

(22) Filed: May 31, 2012

(65) Prior Publication Data

US 2012/0311548 A1 Dec. 6, 2012

(30) Foreign Application Priority Data

Jun. 3, 2011 (KR) .................. 10-2011-0054137

(51) Int. Cl.
*G06F 9/44* (2006.01)
(52) U.S. Cl.
CPC ..................... *G06F 8/70* (2013.01)
(58) Field of Classification Search
None
See application file for complete search history.

(56) References Cited

U.S. PATENT DOCUMENTS

| | | | | |
|---|---|---|---|---|
| 5,950,010 A | * | 9/1999 | Hesse | G06F 8/61 709/220 |
| 6,996,803 B2 | * | 2/2006 | Sakamoto | G06F 8/20 715/826 |
| 7,020,868 B2 | | 3/2006 | Debbins et al. | |
| 7,437,705 B1 | * | 10/2008 | O'Bryan | G06F 8/71 717/100 |
| 7,937,665 B1 | * | 5/2011 | Vazquez et al. | 715/763 |
| 8,315,429 B2 | | 11/2012 | Hattori et al. | |
| 8,938,691 B2 | | 1/2015 | Murata et al. | |
| 2001/0052110 A1 | * | 12/2001 | Orbanes | G06F 3/04815 717/100 |
| 2002/0188938 A1 | | 12/2002 | Dong et al. | |
| 2003/0184782 A1 | * | 10/2003 | Perkins et al. | 358/1.13 |
| 2005/0160104 A1 | * | 7/2005 | Meera | G06F 8/20 |
| 2008/0059960 A1 | * | 3/2008 | Akiyoshi | G06F 9/4406 717/170 |

(Continued)

FOREIGN PATENT DOCUMENTS

| | | |
|---|---|---|
| CN | 1547696 A | 11/2004 |
| CN | 1841316 A | 10/2006 |

(Continued)

OTHER PUBLICATIONS

Extended European Search Report dated Sep. 6, 2012 issued in EP Application No. 12170318.5.

(Continued)

*Primary Examiner* — Lewis A Bullock, Jr.
*Assistant Examiner* — Melissa Alfred
(74) *Attorney, Agent, or Firm* — Staas & Halsey LLP

(57) ABSTRACT

A solution providing tools for developing an application of an image forming apparatus is stored in the image forming apparatus, and functions of the image forming apparatus are displayed according to execution of the solution. An application corresponding to input information of a user is generated by combining functions of the image forming apparatus based on the input information of the user and is stored in the image forming apparatus.

16 Claims, 10 Drawing Sheets

(56) References Cited

U.S. PATENT DOCUMENTS

| | | | |
|---|---|---|---|
| 2008/0141234 A1 | 6/2008 | Becker et al. | |
| 2008/0222600 A1* | 9/2008 | Choi | G06F 8/34 717/107 |
| 2008/0270920 A1* | 10/2008 | Hudson | G06F 8/34 715/763 |
| 2011/0296377 A1* | 12/2011 | Morozov | G06F 8/30 717/113 |

FOREIGN PATENT DOCUMENTS

| | | |
|---|---|---|
| CN | 101083701 A | 12/2007 |
| CN | 101174219 A | 5/2008 |
| EP | 0 704 795 A1 | 4/1996 |
| JP | 8-106390 | 4/1996 |
| JP | 2000-194563 | 7/2000 |
| JP | 2000-339151 | 12/2000 |
| JP | 2001-175622 | 6/2001 |
| JP | 2002-268883 | 9/2002 |
| JP | 2003-22245 | 1/2003 |
| JP | 2008-11500 | 1/2008 |
| JP | 2009-171074 | 7/2009 |
| JP | 2011-107944 | 6/2011 |

OTHER PUBLICATIONS

Jasada Kudtongngam et al: "The Development of High Performance Remote Terminal Unit Using RT-Linux for Distribution System", ICCAS-SICE, 2009, IEEE, Piscataway, NJ, USA, Aug. 18, 2009 (Aug. 18, 2009), pp. 5653-5657, XP031567554, ISBN: 978-4-907764-34-0 p. 5654, line 1-p. 5655, last line; figures 2,3.

Chinese Office Action dated Jun. 20, 2016, from Chinese Patent Application No. 201210181595.6.

Japanese Office Action dated Jun. 21, 2016, from Japanese Patent Application No. 2012-127059.

Chinese Office Action dated Jan. 16, 2017 from Chinese Patent Application No. 201210181595.6, 28 pages.

\* cited by examiner

METHOD AND APPARATUS TO DEVELOP AN APPLICATION OF AN IMAGE FORMING APPARATUS

CROSS-REFERENCE TO RELATED APPLICATIONS

This application claims the benefit of Korean Patent Application No. 10-2011-0054137, filed on Jun. 3, 2011, in the Korean Intellectual Property Office, the disclosure of which is incorporated herein in its entirety by reference.

BACKGROUND OF THE INVENTION

1. Field of the Invention

The present general inventive concept relates to a method and apparatus to develop an application of an image forming apparatus.

2. Description of the Related Art

Recently, the popularization of smart phones in which a cellular phone function and a computer function are combined has increased focus on application development with respect to smart phones. In particular, to encourage the application development, most smart phone manufacturers and vendors employ an open architecture in which an internal structure, e.g., an application programming interface (API), of each type of smart phone is open to the public. The successful progress of such a smart phone application development policy encourages application development on smart televisions (TVs) similar to the smart phones even in a TV field. However, application development in an image forming apparatus field, such as printers, needs more research.

SUMMARY OF THE INVENTION

The present general inventive concept provides a method and apparatus to develop an application of an image forming apparatus, whereby an environment, in which general users, who lack computer knowledge, can easily develop the application without having to perform an upload or download process of the application. The present general inventive concept also provides a recording medium to implement the apparatus to develop an application. The present general inventive concept is not limited to the technical aspects, and other technical aspects may be deduced from the contents of the specification.

Additional features and utilities of the present general inventive concept will be set forth in part in the description which follows and, in part, will be obvious from the description, or may be learned by practice of the general inventive concept.

According to the present general inventive concept, there is provided a method of developing an application of an image forming apparatus, the method including: executing a solution that is stored in the image forming apparatus, the solution providing tools for developing the application of the image forming apparatus; displaying functions of the image forming apparatus according to the execution of the solution; generating an application corresponding to input information of a user by combining the functions based on the input information; and storing the generated application in the image forming apparatus.

The present general inventive concept also provides an image forming apparatus including: hardware elements having a plurality of functions including at least an image forming function; a storage for storing a solution, the solution providing tools for developing an application of the image forming apparatus and at least one application developed by using the solution; and a processor for controlling operations of the hardware elements according to the application by executing the application stored in the storage, wherein the application is generated from combining the functions of the image forming apparatus displayed according to the execution of the solution.

The present general inventive concept also provides a recording medium of an image forming apparatus on which data blocks in a hierarchical structure are recorded, the data blocks including: a firmware block corresponding to firmware including native functions of the image forming apparatus; a wrapper block corresponding to a set of wrapper functions connecting the native functions to application programming interface (API) functions of the image forming apparatus; an API block corresponding to a set of the API functions of the image forming apparatus; and a solution block corresponding to a solution providing tools for developing an application of the image forming apparatus.

The foregoing and/or other aspects and utilities of the present general inventive concept may also be achieved by providing a method of developing an application of an image forming apparatus, the method including executing a solution stored in the image forming apparatus, the solution providing tools to develop an application of the image forming apparatus; displaying functions of the image forming apparatus; combining functions in accordance with information input by a user; and generating an application in accordance with the input information.

The method may further comprise setting an environment of the image forming apparatus required to develop an application by securing a memory space of a storage of the image forming apparatus; and storing the generated application in the storage.

The foregoing and/or other aspects and utilities of the present general inventive concept may also be achieved by providing an image forming apparatus including hardware elements including functions of an image forming apparatus; a storage to store a solution, the solution providing tools to develop an application; and a processor to control operations of the hardware elements according to the solution stored in the storage, an application being generated by combining functions arranged in accordance with information input by a user, the generated application being stored in the storage.

The tools may be described with binary codes executable in an operating system of a host, and the solution being executed by any one of the host or the image forming apparatus.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
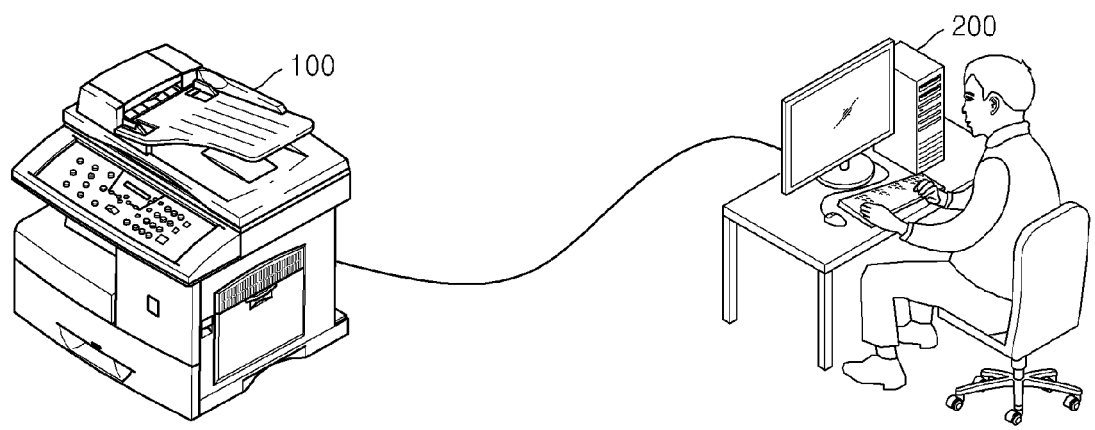
FIG. 1 illustrates a printer application development environment according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

In particular, as an example of an image forming apparatus disclosed in the claims, a printer having a print function for forming a physical image on paper and a scan function for detecting an image recorded on paper will be described as an embodiment of the present general inventive concept. However, the printer may represent a multifunctional peripheral (MFP). In addition, the image forming apparatus disclosed in the claims may be applied to other types of image forming apparatuses besides the printer described below.

FIG. 1 is a printer application development environment according to an embodiment of the present general inventive concept. In FIG. 1, as an example of a printer 100, an MFP having the print function and the scan function is shown. However, this is only an example, and the printer 100 may be another type of a printer, e.g., a printer without having the scan function, besides the MFP. In addition, in FIG. 1, as an example of a host 200, a personal computer (PC) is shown. However, this is only an example, and the host 200 may be another type of host besides the PC, e.g., a cellular phone, such as a smart phone, having a computer function.

Since the printer 100 has to basically perform a function of printing content, such as text and images, transmitted from the host 200, the printer 100 and the host 200 are almost always connected to each other in a wired or wireless manner. Thus, the host 200 can more easily access the printer 100 than other electronic devices, such as a smart phone or a TV. The easy access to the printer 100 can provide an excellent environment required to develop an application of the printer 100 in the host 200.

Meanwhile, in a case of embedded systems, such as smart phones, to encourage application development, hardware manufacturers and vendors employ an open architecture in which application programming interfaces (APIs) are opened to the public. In general, the application development is performed not in the embedded systems but in PCs supporting hardware performance required for the application development. To develop an application of smart phones in a PC, a cross compiler for translating the application into a binary file consisting of codes executable in the smart phones and an emulator for virtually executing the application in the PC have to be installed in the PC. Such an application developed in a PC is uploaded to an online application store. A user downloads the uploaded application to a smart phone of the user and uses the downloaded application.

As described above, in a conventional application development environment, an application developer has to install and use programs, such as a cross compiler and an emulator, in a PC, and this is an obstacle when most people who lack computer knowledge develop an application. In addition, the process of uploading an application to an online application store or downloading an application from the online application store requires a process of connecting the PC or a smart phone to a universal serial bus (USB) or a network, resulting in inconvenience to users. In particular, for general users who lack computer knowledge, when certain requirements arise in an embedded system, such as a smart phone, they have to wait for firmware updating or application launching to satisfy the requirements.

In the embodiments described below, by using easy access to the printer 100, an environment in which general users, who lack computer knowledge, may be provided in which the general users can easily develop an application by using graphic tools on a screen of a PC without having to install programs, such as a cross compiler and an emulator, in the PC. Accordingly, user requirements of the printer 100 can be immediately satisfied. In addition, in the embodiments described below, user inconvenience can be minimized by removing the processes of uploading an application to an online application store and downloading an application from the online application store.

Figure 2:
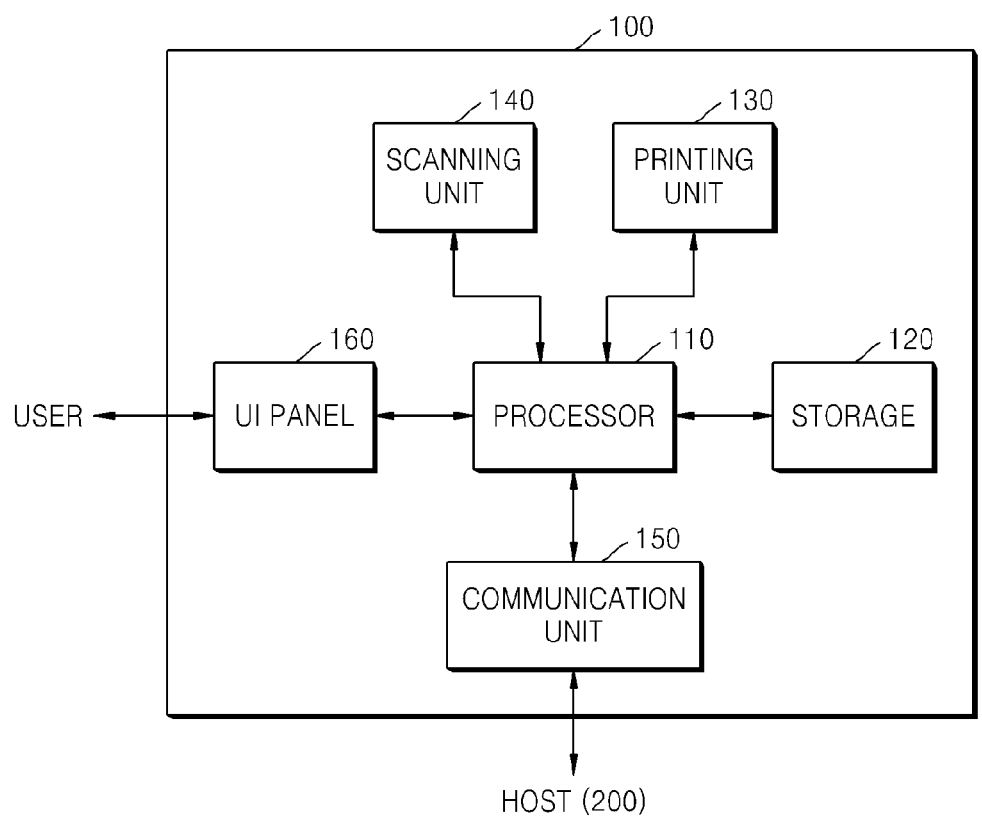
FIG. 2 illustrates a block diagram of a printer according to an embodiment of the present general inventive concept.

FIG. 2 is a block diagram of the printer 100 according to an embodiment of the present general inventive concept. Referring to FIG. 2, the printer 100 includes a processor 110, a storage 120, a printing unit 130, a scanning unit 140, a communication unit 150, and a user interface (UI) panel 160. The printer 100 shown in FIG. 2 has the printer function and the scan function. However, this is only an example, and technical features of the embodiments described below may be applied to other types of printers, e.g., a printer without the scan function. In addition, the above-described hardware elements are only examples of fundamental components having general functions in a printer, and another hardware element may be further added to the printer 100 shown in FIG. 2. For example, the printer 100 may further include a hardware element having a public switched telephone network (PSTN)-based telephone function for supporting a fax function.

The processor 110 controls operations of hardware elements of the printer 100 according to an application stored in the storage 120 by executing the application. In more detail, the processor 110 controls operations of the hardware elements, e.g., the storage 120, the communication unit 150, the printing unit 130, the scanning unit 140, and the UI panel 160, of the printer 100 according to instructions of the application by executing the instructions of the application based on firmware, such as an operating system (OS) and a device driver, of the printer 100. Accordingly, the application may perform a certain function of the printer 100. In the current embodiment, the term "execution" indicates that the processor 110 carries out instructions of an application, and the term "performing" indicates that a certain function of the printer 100 is performed by executing a computer program, such as an application. The processor 110 may be implemented with a single chip or with a plurality of chips, such as a central processing unit (CPU) and a dedicated processor. The dedicated processor may be a processor taking full charge of a specific work of the printer 100, for example, a network processor for processing data packets transmitted and received through a network.

The storage 120 stores or provides data according to control of the processor 110. The storage 120 stores various kinds of data, such as firmware, e.g., an OS and a device driver, execution files, e.g., an application, and content, e.g., text and images, requested to be printed by the printing unit 130. The storage 120 may be implemented with a single storage medium, such as a flash memory, or with a plurality of storage media, such as random access memory (RAM), read only memory (ROM), a hard disk, and a flash memory. Furthermore, the storage 120 may include a memory device detachable from the printer 100. For example, a program called an application development solution, described below, may be stored in the memory device detachable from the printer 100.

The printing unit 130 prints content, such as text and images, input from the processor 110 according to a control of the processor 110. The printing unit 130 may be divided into a mechanical part to deliver paper and an engine part to form an image on the paper. The scanning unit 140 detects an image on paper inserted into the scanning unit 140 according to a control of the processor 110. The scanning unit 140 may be divided into an image sensor to detect an image on paper and a mechanical part to traverse the image sensor. Since detailed structures and operations of the printing unit 130 and the scanning unit 140 do not correspond to the features of the current embodiment, and are well known in the technical field to which the embodiment illustrated in FIG. 2 belongs, a detailed description thereof will be omitted.

The communication unit 150 communicates with another device, such as the host 200, according to a control of the processor 110. The communication unit 150 may receive content and a print command about the content from the host 200 and transmit a response indicating a processing result to the host 200. The communication unit 150 may be divided into a mechanical part, such as a connector, into which communication cables, such as a USB cable and a network cable, are plugged and a circuit part to control data transmission according to various communication methods, such as a USB standard and a network communication standard. The above-described USB and network are only examples of currently used various communication methods, and the communication unit 150 may support other communication methods, e.g., Bluetooth.

In the current embodiment, to directly store an application developed in the host 200 in the storage 120 without uploading or downloading the application, the host 200 may read and execute an application development solution providing tools for developing an application of the printer 100 from the storage 120, and store an application developed by using the application development solution in the storage 120. To do this, the communication unit 150 may have a function of connecting the storage 120 to the host 200 so that the host 200 can recognize the storage 120. If an application is not developed in the host 200, but developed in the printer 100, the communication unit 150 does not have to have the connecting function.

Unlike a PC for performing general data processing work, such as word processing and web surfing, since the printer 100 is designed as a type of an embedded system having limited resources to print work or to scan work, general input and output devices, such as a mouse, a keyboard, and a monitor, are not generally included in the printer 100. According to the embodiments to be described below, since tools for developing an application are provided in a form of a graphic user interface (GUI) so as not to require a text input, an application can be developed by using a touch screen of the UI panel 160. In this case, a sufficient hardware performance of the printer 100 to develop an application, e.g., performance of the processor 110, and a capacity of the storage 120, has to be supported.

When the communication unit 150 has the function of connecting the storage 120 to the host 200, the application development solution stored in the storage 120 is read and executed by the host 200 via the communication unit 150. For example, when the printer 100 is connected to the host 200 via a USB, the communication unit 150 connects the storage 120 to the host 200 by using a Mass Storage Class (MSC) protocol of the USB. In this case, the storage 120 may be recognized as a removable disk by the host 200 through the MSC protocol. As another example, when the printer 100 is connected to the host 200 via a network, the communication unit 150 connects the storage 120 to the host 200 by using a Server Message Block (SMB) protocol of the network. In this case, the storage 120 may be recognized as a network drive by the host 200 through the SMB protocol.

The USB and the network are only examples of currently used various communication media, and the storage 120 of the printer 100 may be connected to the host 200 via another communication medium. Data used to develop an application of the printer 100, e.g., the application development solution and user input information, and the application generated by using the data, are transmitted through a communication medium for connecting the storage 120 of the printer 100 to the host 200. In addition, a communication medium for transmitting data for performing a certain function of the printer 100, such as content to be desired by the host 200 to print, is also required. The former communication medium and the latter communication medium may exist separately or may be the same communication medium. For example, the host 200 and the printer 100 may transmit and receive data associated with application development via a USB and simultaneously transmit and receive data associated with a print job of the printer 100 via a network. Alternatively, the host 200 and the printer 100 may simultaneously transmit and receive data associated with application development and data associated with a print job of the printer 100 via a single USB. In this case, the communication unit 150 connects the printer 100 to the host 200 by using a Printer Class protocol of the USB, and the host 200 transmits the data associated with the print job of the printer 100 by using the Printer Class protocol.

The UI panel 160 interfaces between a user and the printer 100 according to control of the processor 110. For example, the UI panel 160 may display, in graphic form, tools that may be used by the user to select and combine functions of the printer 100, according to control of the processor 110.

When the user inputs a certain instruction or information into the UI panel 160 by using the tools, the UI panel 160 transmits the instruction or information to the processor 110. The UI panel 160 may display the functions of the printer 100 in a form of icons to display the tools for using the functions of the printer 100 to the user in the graphic form. The functions of the printer 100 may be functions of API functions or functions of modules corresponding to combinations of the API functions. As described above, since the printer 100 is designed in a type of an embedded system having limited resources for processing a print work or a scan work, general input and output devices, such as a mouse, a keyboard, and a monitor, are not generally included in the printer 100. Accordingly, the UI panel 160 is generally implemented with a touch screen or a small liquid crystal display (LCD) screen and several input buttons.

Figure 3:
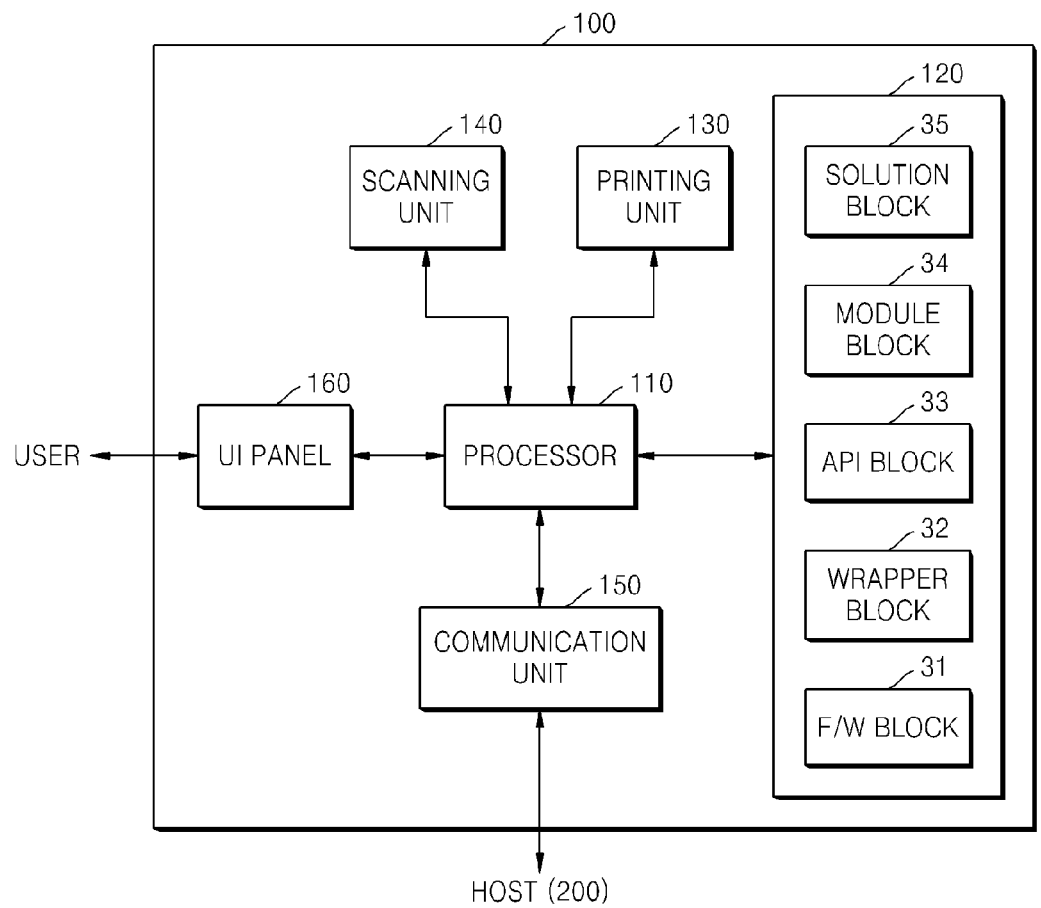
FIG. 3 illustrates a block diagram of an application development apparatus of the printer, according to an embodiment of the present general inventive concept.

FIG. 3 is a block diagram of an application development apparatus of the printer 100, according to an embodiment of the present general inventive concept. The embodiment shown in FIG. 3 corresponds to a case where an application of the printer 100 is developed by using modules that are binary files in a form in which combinations of API functions are previously cross-compiled. Unlike a case where compiling is performed by using the cross compiler stored in the host 200, since an application corresponding to a combination of modules that are binary files in a previously cross-compiled form is generated and automatically stored in the storage 120 of the printer 100, the cross compiler and the emulator do not have to be installed in the host 200, and uploading and downloading processes of the application do not have to be performed. Referring to FIG. 3, the storage 120 stores data blocks in a hierarchical structure, such as a firmware (F/W) block 31, a wrapper block 32, an API block 33, a module block 34, and a solution block 35. As described above, the storage 120 may further store various kinds of data, such as content, e.g., text and images, and applications.

The F/W block 31 is a data block corresponding to firmware to perform various functions of the printer 100 by being executed by the processor 110 and driving hardware elements of the printer 100. Representative examples of the firmware are an OS and a device driver forming a platform of the printer 100. Examples of the hardware elements of the printer 100 are the communication unit 150, the printing unit 130, the scanning unit 140, and the UI panel 160. The firmware describes operations of the hardware elements of the printer 100 to respectively perform the various functions of the printer 100 with binary codes executable in the processor 110, and the processor 110 controls the operations of the hardware elements of the printer 100 according to the firmware. The F/W block 31 includes native functions to perform respective unit functions of the printer 100, which are executed by the processor 110. A single native function describes operations of the hardware elements of the printer 100 to perform a corresponding unit function of the printer 100 with binary codes. For example, a single native function may perform a big function, such as a scan start of the scanning unit 140, or a small function, such as a rotation of a motor for delivering paper at a 1° angle. The processor 110 controls at least one hardware element of the printer 100 to perform a function corresponding to each of the native functions included in the F/W block 31.

The wrapper block 32 is a data block corresponding to a set of wrapper functions to one-to-one connect the native functions of the F/W block 31 and API functions of the API block 33. The API block 33 is a data block corresponding to a set of API functions to perform unit functions of the printer 100 by being one-to-one connected to the native functions of the F/W block 31 through the wrapper functions of the wrapper block 32 and being executed by the processor 110. Since the API functions exist in an upper layer of the native functions, unlike the native functions, the API functions can be directly called in an application and can be used regardless of any OS of any computer system. Accordingly, an application developer can develop an application of any embedded system other than a PC by using the API functions in the PC. That is, in the current embodiment, an API function interfaces between firmware and an application so that the application can request the firmware of the printer 100 to perform a predetermined function.

The module block 34 is a data block corresponding to a set of modules that are executed by the processor 110 and perform functions corresponding to combinations of some of the API functions of the API block 33. Conventionally, an application developer makes an application of an embedded system, such as a smart phone, by combining API functions, provided by a hardware manufacturer or a vendor, with a programming language designated as a development language in a PC. Accordingly, cross compiling to translate the application made with the programming language into a binary file executable in the embedded system is required. In the current embodiment, to remove such a cross compiling process, each of the modules is a binary file obtained by previously cross compiling a combination of some of the API functions of the API block 33. That is, in each of the modules in the current embodiment, a function of the printer 100, corresponding to a combination of some of the API functions of the API block 33, is described with binary codes executable in the printer 100 by using the combination of some of the API functions of the API block 33. The binary codes executable in the printer 100 indicate binary codes executable in the firmware of the printer 100 and eventually indicate binary codes executable by the processor 110.

Figure 4:
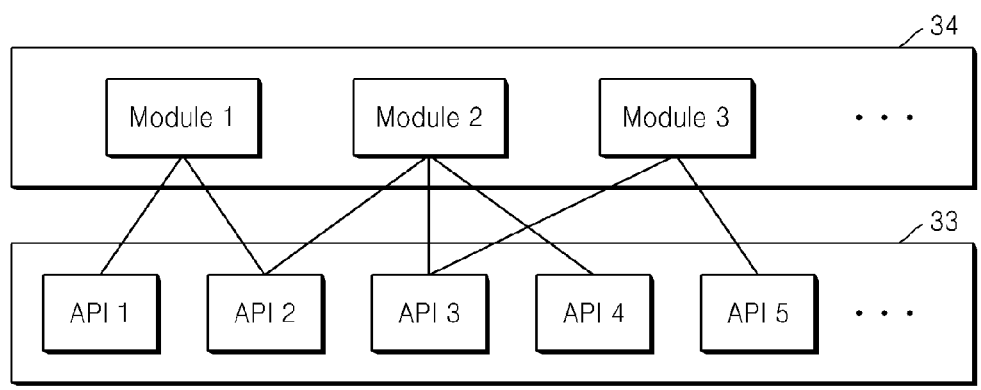
FIG. 4 illustrates a connection relationship between an application programming interface (API) block and a module block shown in FIG. 3.

FIG. 4 illustrates a connection relationship between the API block 33 and the module block 34 shown in FIG. 3. Referring to FIG. 4, a first module 1, corresponds to a combination of a first API 1, and a second API 2, and a second module 2, corresponds to a combination of the second API 2, a third API 3, and a fourth API 4, and a third module 3, corresponds to a combination of the third API 3, and a fifth API 5. For example, a module to detect an e-mail received through an e-mail address of at least one user, predetermined from among users of the printer 100, may be generated by combining an API function to read e-mail addresses of users from an address book stored in the storage 120 of the printer 100, an API function to designate some of the e-mail addresses, and an API function to detect an email received through a predetermined e-mail address.

Referring back to FIG. 3, the solution block 35 is a data block corresponding to an application development solution providing tools for developing an application of the printer 100 in a form of a GUI by using the API functions of the printer 100. In the embodiment shown in FIG. 3, the application development solution provides graphic tools for a user to select and combine some modules corresponding to combinations of API functions. In more detail, the application development solution may be the uppermost layer taking charge in interaction with the user, and by executing the application development solution, information regarding modules can be read from the module block 34, and the information regarding the modules can be provided to the user. For example, the application development solution may display the information regarding the modules to the user in a form of icons. The user may develop various applications by variously combining modules with reference to the information regarding the modules. Furthermore, the application development solution may provide a function allowing the user to modify modules or create new modules. For example, the application development solution may read information regarding the API functions from the API block 33 and provide the information regarding the API functions to the user. The user may modify modules or create new modules by referring to the information regarding the API functions.

According to the application development solution in the embodiment shown in FIG. 3, the tools to develop an application of the printer 100 can be described with binary codes executable in an OS of the host 200, whereby the application development solution can be executed by the host 200. Alternatively, according to the application development solution, the tools to develop an application of the printer 100 can be described with binary codes executable in an OS of the printer 100, whereby the application development solution can be executed by the printer 100.

Figure 5:
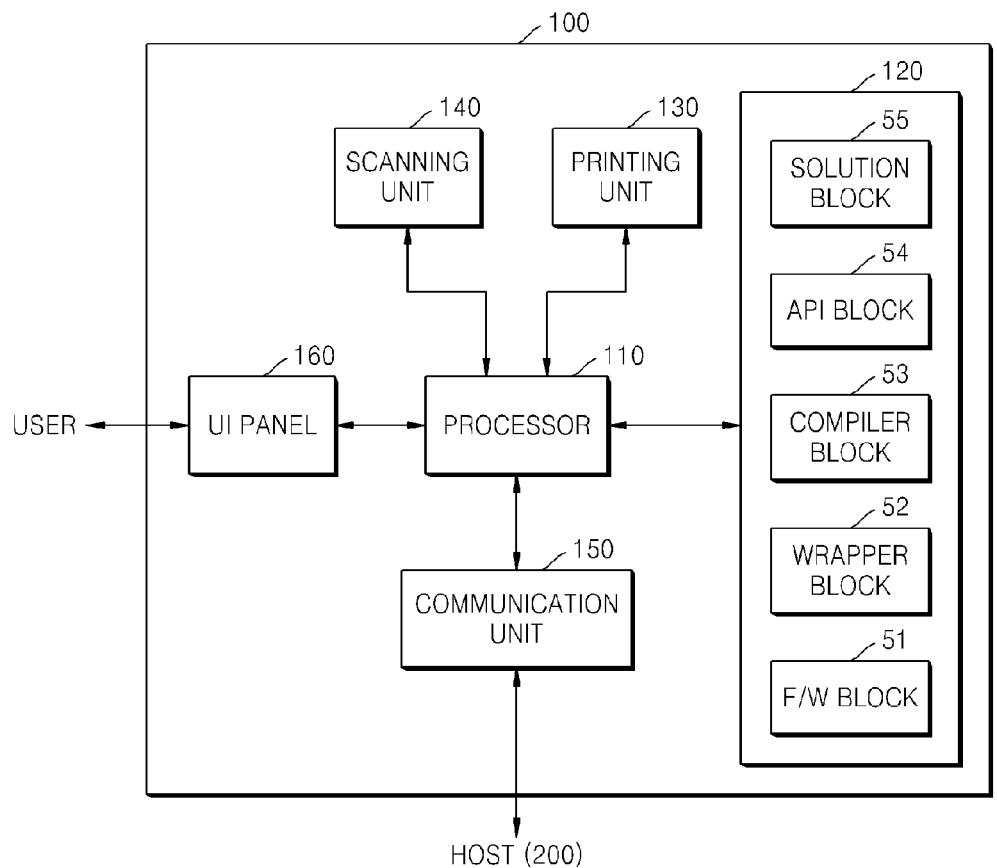
FIG. 5 illustrates a block diagram of an application development apparatus of the printer, according to another embodiment of the present general inventive concept.

FIG. 5 is a block diagram of an application development apparatus of the printer 100, according to another embodiment of the present general inventive concept. The embodiment shown in FIG. 5 corresponds to a case where an application developed by a user is compiled by a cross compiler stored in the storage 120 of the printer 100. Unlike a case where compiling is performed by using the cross compiler stored in the host 200, since the application developed by the user is automatically stored in the storage 120 of the printer 100 and compiled, the cross compiler and the emulator do not have to be installed in the host 200, and uploading and downloading processes of the application do not have to be performed. Referring to FIG. 5, the storage 120 stores data blocks in a hierarchical structure, such as an F/W block 51, a wrapper block 52, a compiler block 53, an API block 54, and a solution block 55. Since the F/W block 51, the wrapper block 52, and the API block 54 are the same data blocks as the F/W block 31, the wrapper block 32, and the API block 33 shown in FIG. 3, these will not be described again.

The compiler block 53 is a data block corresponding to a cross compiler for translating programming codes of an application developed by using an application development solution to binary codes executable in the printer 100. The solution block 55 is a data block corresponding to an application development solution providing tools for developing an application of the printer 100 in a form of a GUI by using the API functions of the printer 100. In the embodiment shown in FIG. 5, the application development solution provides graphic tools for a user to select and combine some modules corresponding to combinations of API functions. In more detail, the application development solution may be the uppermost layer taking charge in an interaction with the user, and by executing the application development solution, information regarding APIs can be read from the API block 54, and the information regarding the APIs can be provided to the user. For example, the application development solution may display the information regarding the APIs to the user in a form of icons. The user may develop various applications by variously combining APIs with reference to the information regarding the APIs.

According to the application development solution in the embodiment shown in FIG. 5, the tools for developing an application of the printer 100 can be described with binary codes executable in the OS of the host 200, whereby the application development solution can be executed by the host 200. Alternatively, according to the application development solution, the tools for developing an application of the printer 100 can be described with binary codes executable in the OS of the printer 100, whereby the application development solution can be executed by the printer 100.

Figure 6:
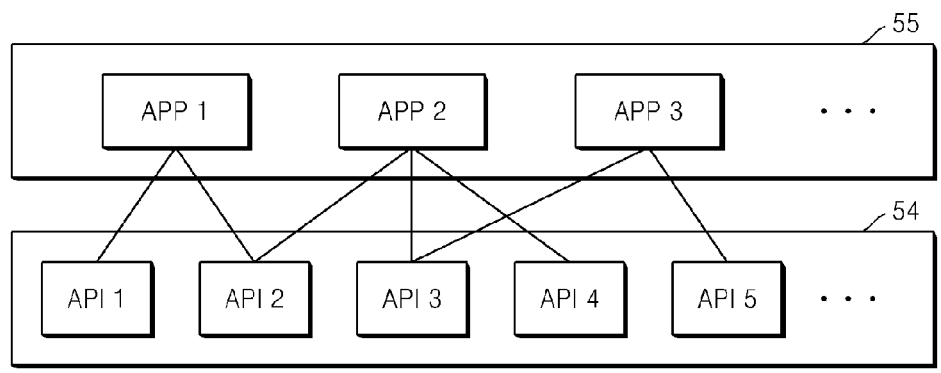
FIG. 6 illustrates a connection relationship between an API block and a solution block shown in FIG. 5.

FIG. 6 illustrates a connection relationship between the API block 54 and the solution block 55 shown in FIG. 5. Referring to FIG. 6, a first application 1, corresponds to a combination of a first API 1, and a second API 2, a second application 2, corresponds to a combination of the second API 2, a third API 3, and a fourth API 4, and a third application 3, corresponds to a combination of the third API 3, and a fifth API 5. For example, an application for printing an e-mail, received through an e-mail address of at least one user predetermined from among users of the printer 100, may be generated by combining the API function to read e-mail addresses of users from an address book stored in the storage 120 of the printer 100, the API function to designate some of the e-mail addresses, the API function for detecting an email received through a predetermined e-mail address, an API function for transforming content of the email to a printable form, an API function to deliver printing paper, and an API function to print data in the printable form. The above-described API functions are only examples, and various API functions may be provided by hardware manufacturers and vendors.

Figure 7:
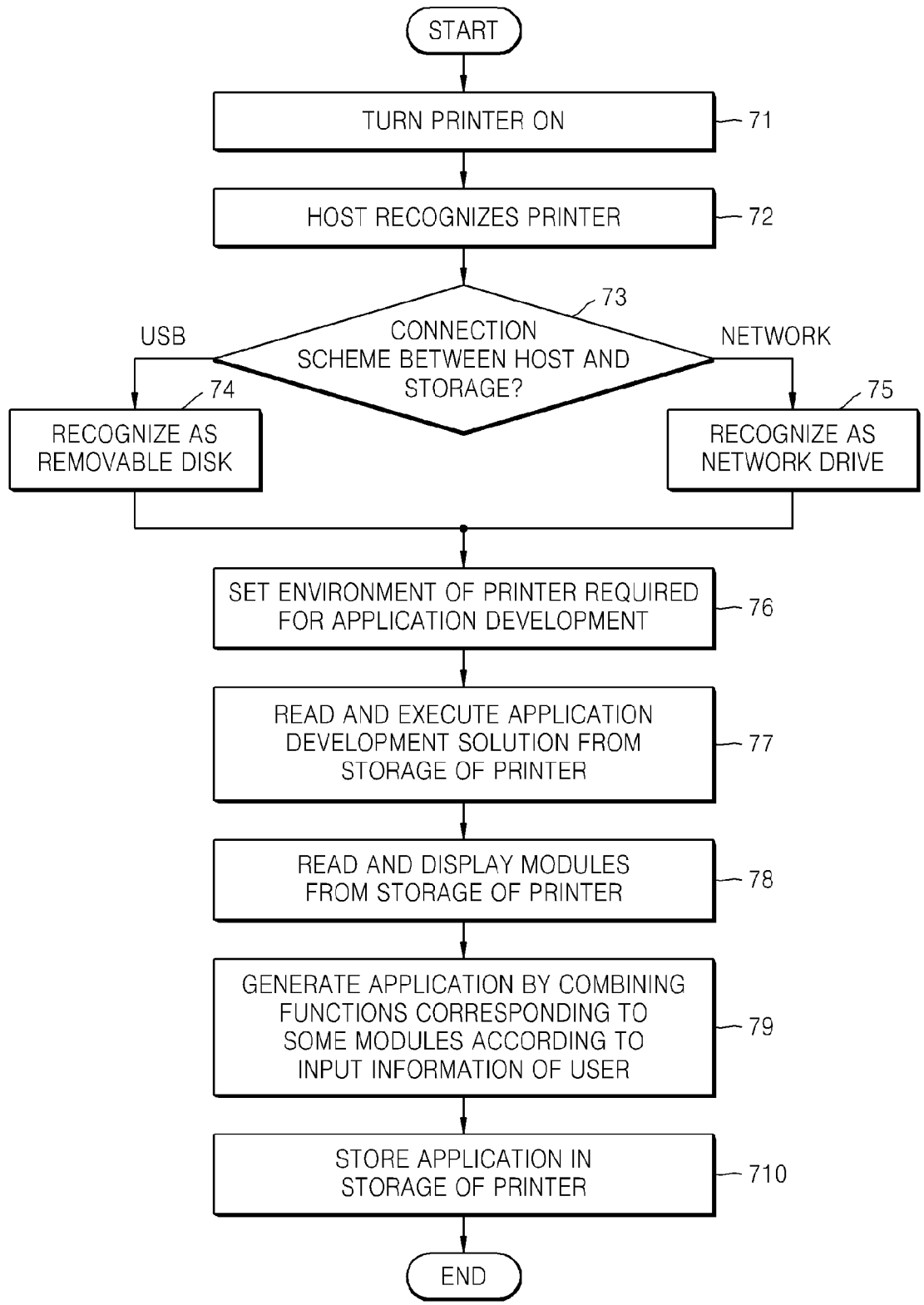
FIG. 7 is a flowchart illustrating a method of developing an application of the printer, according to an embodiment of the present general inventive concept.

FIG. 7 is a flowchart illustrating a method of developing an application of the printer 100, according to an embodiment of the present general inventive concept. The method shown in FIG. 7 corresponds to a case where an application of the printer 100 is developed by using modules that are binary files in a form in which combinations of API functions are previously cross-compiled, and includes operations sequentially processed by the printer 100 and the host 200 shown in FIG. 3. Thus, although not described below, the contents described above about the printer 100 and the host 200, shown in FIG. 3, is applied to the method shown in FIG. 7.

In operation 71, when a user turns the printer 100 on, power is supplied to the hardware elements of the printer 100. The printer 100 is connected to the host 200 via a communication cable, such as a USB cable or a network cable. In operation 72, the host 200 recognizes the printer 100. For example, a driver of the printer 100 is installed in the host 200, and the OS of the host 200 can recognize the printer 100 by means of the driver. If the host 200 is one-to-one connected to the printer 100, the host 200 recognizes the printer 100 as a local printer. If the host 200 is connected to the printer 100 via a network, the host 200 recognizes the printer 100 as a network printer.

According to the embodiment shown in FIG. 3, data to develop an application of the printer 100, such as the application development solution of the printer 100, is stored in the storage 120 of the printer 100. The host 200 reads the application development solution of the printer 100 from the storage 120 of the printer 100 and executes the application development solution of the printer 100. The host 200 stores an application generated by using the application development solution of the printer 100 in the storage 120 of the printer 100. As such, in order for the host 200 to read or store certain data from or in the storage 120 of the printer 100, the host 200 has to be able to recognize the storage 120 of the printer 100 as if it is a local storage of the host 200. That is, in the embodiment shown in FIG. 7, the host 200 recognizes the printer 100 as a local printer or a network printer and simultaneously recognizes the storage 120 of the printer 100.

In order for the host 200 to recognize the storage 120 of the printer 100, the host 200 has to identify a communication medium to connect the host 200 to the storage 120 of the printer 100, and a communication protocol for connecting the host 200 to the storage 120 of the printer 100 depends on a type of the communication medium. Accordingly, in operation 73, the host 200 identifies a connection scheme between the host 200 and the storage 120 of the printer 100. For example, if the host 200 is connected to the storage 120 of the printer 100 via a USB, the host 200 identifies the connection scheme between the host 200 and the storage 120 of the printer 100 as a USB in operation 73 and proceeds to operation 74, if the host 200 is connected to the storage 120 of the printer 100 via a network, the host 200 identifies the connection scheme between the host 200 and the storage 120 of the printer 100 as a network in operation 73 and proceeds to operation 75. In operation 74, the host 200 recognizes the storage 120 of the printer 100 as a removable disk through the MSC protocol of the USB. In operation 75, the host 200 recognizes the storage 120 of the printer 100 as a network drive through the SMB protocol.

In operation 76, when the host 200 receives an execution command of the application development solution of the printer 100 from a user and transmits the execution command to the printer 100, the printer 100 sets an environment of the printer 100 required for application development by securing a memory space of the storage 120 required for execution of the API functions included in the API block 33 of the storage 120, execution of the modules included in the module block 34 of the storage 120, and execution of the application development solution included in the solution block 35 of the storage 120 and initializing the API functions, the modules, and the application development solution. For example, an icon indicating the application development solution of the printer 100 may be displayed on a screen of the host 200. If the user clicks this icon by using an input device, such as a mouse, the host 200 receives an execution command of the application development solution of the printer 100 from the user and transmits the execution command to the printer 100. An example of the initialization of the API functions, the modules, and the application development solution is combining program internal variables of the API functions, the modules, and the application development solution to initial values. If the environment setup of the printer 100 in operation 76 is completed, the application development solution stored in the storage 120 of the printer 100 can be read by the host 200. The process of setting the environment of the printer 100 in operation 76 may be omitted according to hardware performance of the printer 100, characteristics of the API functions of the printer 100, etc.

In operation 77, the host 200 reads and executes the application development solution of the printer 100 from the storage 120 of the printer 100 recognized in either operation 74 or operation 75. That is, according to the execution of the application development solution, a window, on which graphic tool to develop an application of the printer 100 are displayed, is displayed on the screen of the host 200. In operation 78, the host 200 reads modules indicating functions of the printer 100 from the storage 120 of the printer 100, recognized in either operation 74 or operation 75, in the window including the graphic tools for developing an application of the printer 100, and displays the modules as icons.

In operation 79, the host 200 generates an application corresponding to input information of the user by combining some of the modules displayed in operation 78 according to the information input from the user. When the user recognizes functions of the icons corresponding to the modules in the window displayed in operation 77, the user combines modules corresponding to components of an application desired by the user by using an input device, such as a mouse. As described above, each of the modules describes a function of the printer 100 corresponding to a specific combination of API functions with binary codes executable in the printer 100. The host 200 may generate an application described with binary codes by combining functions of the printer 100 described with binary codes by the modules according to the combination of the modules designated by the user. In operation 710, the host 200 stores the application generated in operation 79 in the storage 120 of the printer 100 recognized in either operation 74 or operation 75.

On the other hand, if an application is developed in the printer 100 instead of the host 200, since the host 200 does not have to recognize the printer 100 and the storage 120 of the printer 100, operations 72 to 75 are omitted, and operations 76 to 710 are performed by the printer 100 instead of the host 200. For example, when the printer 100 receives an execution command of the application development solution of the printer 100 from the user, the printer 100 sets an environment of the printer 100 required for application development and executes the application development solution.

Figure 8:
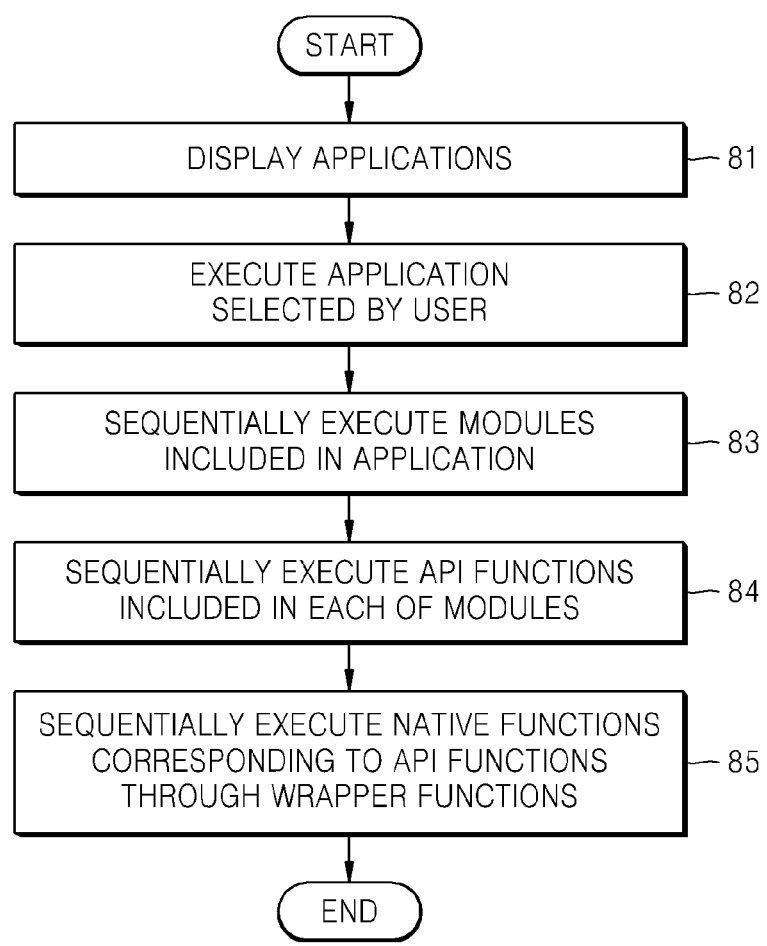
FIG. 8 is a flowchart illustrating a method of executing an application of the printer, according to an embodiment of the present general inventive concept.

FIG. 8 is a flowchart illustrating a method of executing an application of the printer 100, according to an embodiment of the present general inventive concept. The method shown in FIG. 8 corresponds to a case where an application of the printer 100, developed by using modules that are binary files in a form in which combinations of API functions are previously cross-compiled, is executed, and includes operations sequentially processed by the printer 100 shown in FIG. 3. Thus, although not described below, the contents described above about the printer 100 shown in FIG. 3 are applied to the method shown in FIG. 8.

In operation 81, the printer 100 displays applications stored in the storage 120 of the printer 100. The applications may be displayed in a form of icons on the UI panel 160. In operation 82, when the printer 100 receives information indicating any one of the applications displayed in operation 81 from a user, the printer 100 executes the application selected by the user. The user may select an application by touching, or initiating via the UI panel, any one of the icons displayed on the UI panel 160. In operation 83, the printer 100 sequentially reads and executes modules included in the application from the module block 34 in a combination order of the modules according to the execution of the application in operation 82. In operation 84, the printer 100 sequentially reads and executes API functions included in each of the modules from the API block 33 in a combination order of the API functions according to the execution of the modules in operation 83. In operation 85, the printer 100 drives the hardware elements of the printer 100 by sequentially reading and executing native functions respectively corresponding to the API functions from the F/W block 31 through wrapper functions that respectively connect the API functions to the native functions, according to the execution of the API functions in operation 84. By driving the hardware elements of the printer 100, a function of the printer 100, indicated by the selected application, is performed.

Figure 9:
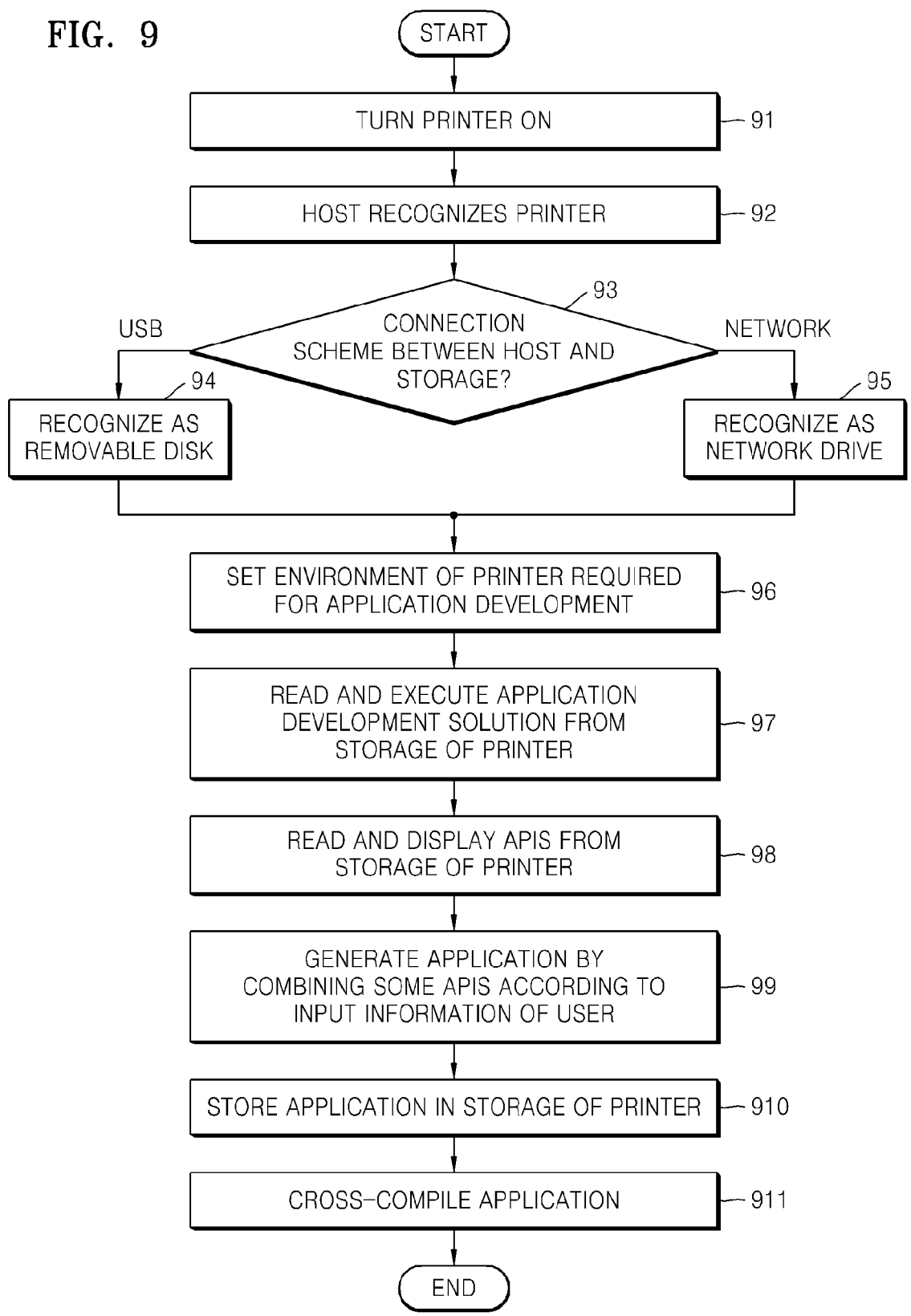
FIG. 9 is a flowchart illustrating a method of developing an application of the printer, according to another embodiment of the present general inventive concept.

FIG. 9 is a flowchart illustrating a method of developing an application of the printer 100, according to another embodiment of the present general inventive concept. The method shown in FIG. 9 corresponds to a case where an application developed by a user is compiled by a cross compiler stored in the storage 120 of the printer 100, and includes operations sequentially processed by the printer 100 and the host 200, as shown in FIG. 5. Thus, although not described below, the contents described above about the printer 100 and the host 200, shown in FIG. 5, is applied to the method shown in FIG. 9.

Since the process of recognizing the printer 100 and the storage 120 of the printer 100 is the same as the method shown in FIG. 7, operations 91 to 95 are identical to operations 71 to 75. In addition, for the remaining operations, only parts that are different from the method shown in FIG. 7 are described.

In operation 96, when the host 200 receives an execution command of the application development solution of the printer 100 from a user and transmits the execution command to the printer 100, the printer 100 sets an environment of the printer 100 required for application development by securing a memory space of the storage 120 required for execution of the cross compiler included in the compiler block 53 of the storage 120 of the printer 100, execution of the API functions included in the API block 54 of the storage 120, and execution of the application development solution included in the solution block 55 of the storage 120, and initializing the cross compiler, the API functions, and the application development solution. In operation 97, the host 200 reads and executes the application development solution of the printer 100 from the storage 120 of the printer 100 recognized in either operation 94 or operation 95. In operation 98, the host 200 reads APIs indicating functions of the printer 100 from the storage 120 of the printer 100 recognized in operation 94 or 95 in a window including graphic tools for developing an application of the printer 100, and displays the APIs as icons. In operation 99, the host 200 generates an application corresponding to input information of the user by combining some of the APIs displayed in operation 98 according to the information input from the user. In operation 910, the host 200 stores the application generated in operation 99 in the storage 120 of the printer 100 recognized in operation 94 or 95. In operation 911, the printer 100 generates an application having binary codes executable in the printer 100 by cross compiling the application stored in operation 910 and stores the generated application in the storage 120 of the printer 100.

Like the method shown in FIG. 7, if an application is developed in the printer 100 instead of the host 200, since the host 200 does not have to recognize the printer 100 and the storage 120 of the printer 100, operations 92 to 95 are omitted, and operations 96 to 910 are performed by the printer 100 instead of the host 200.

Figure 10:
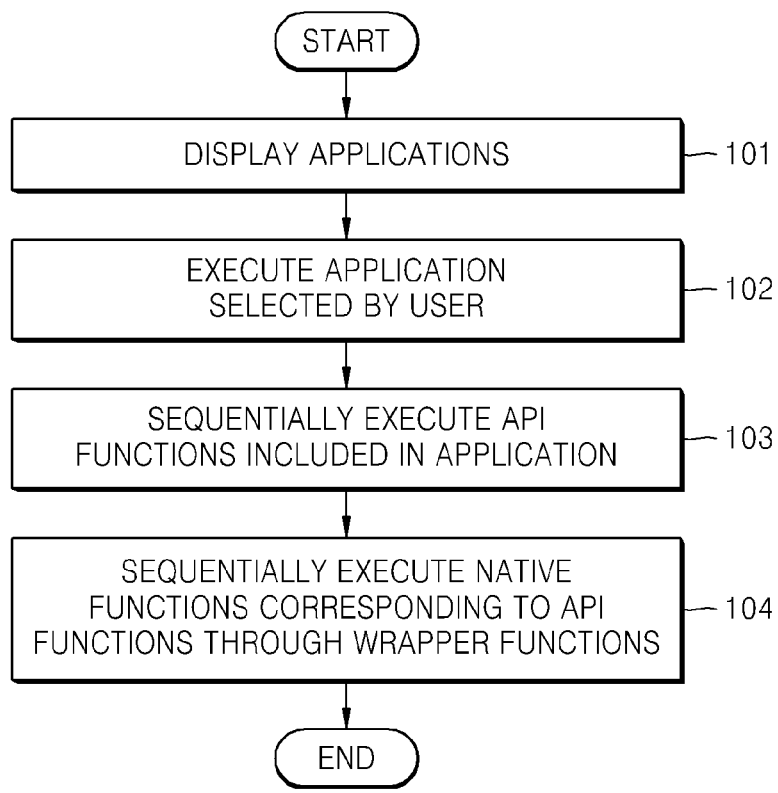
FIG. 10 is a flowchart illustrating a method of executing an application of the printer, according to another embodiment of the present general inventive concept.

FIG. 10 is a flowchart illustrating a method of executing an application of the printer 100, according to another embodiment of the present general inventive concept. The method shown in FIG. 10 corresponds to a case where an application is compiled and executed by a cross compiler stored in the storage 120 of the printer 100, and includes operations sequentially processed by the printer 100, as shown in FIG. 5. Thus, although not described below, the contents described above about the printer 100, shown in FIG. 5, is applied to the method shown in FIG. 10.

Since the process of selecting an application by a user is the same as the method shown in FIG. 8, operations 101 and 102 are identical to operations 81 and 82. In addition, for the remaining operations, only parts that are different from the method shown in FIG. 8 will be described.

In operation 103, the printer 100 sequentially reads and executes API functions included in the application from the API block 54 in a combination order of the API functions according to the execution of the application in operation 102. In operation 104, the printer 100 drives the hardware elements of the printer 100 by sequentially reading and executing native functions respectively corresponding to the API functions from the F/W block 51 through wrapper functions that respectively connect the API functions to the native functions, according to the execution of the API functions in operation 103.

Figure 11:
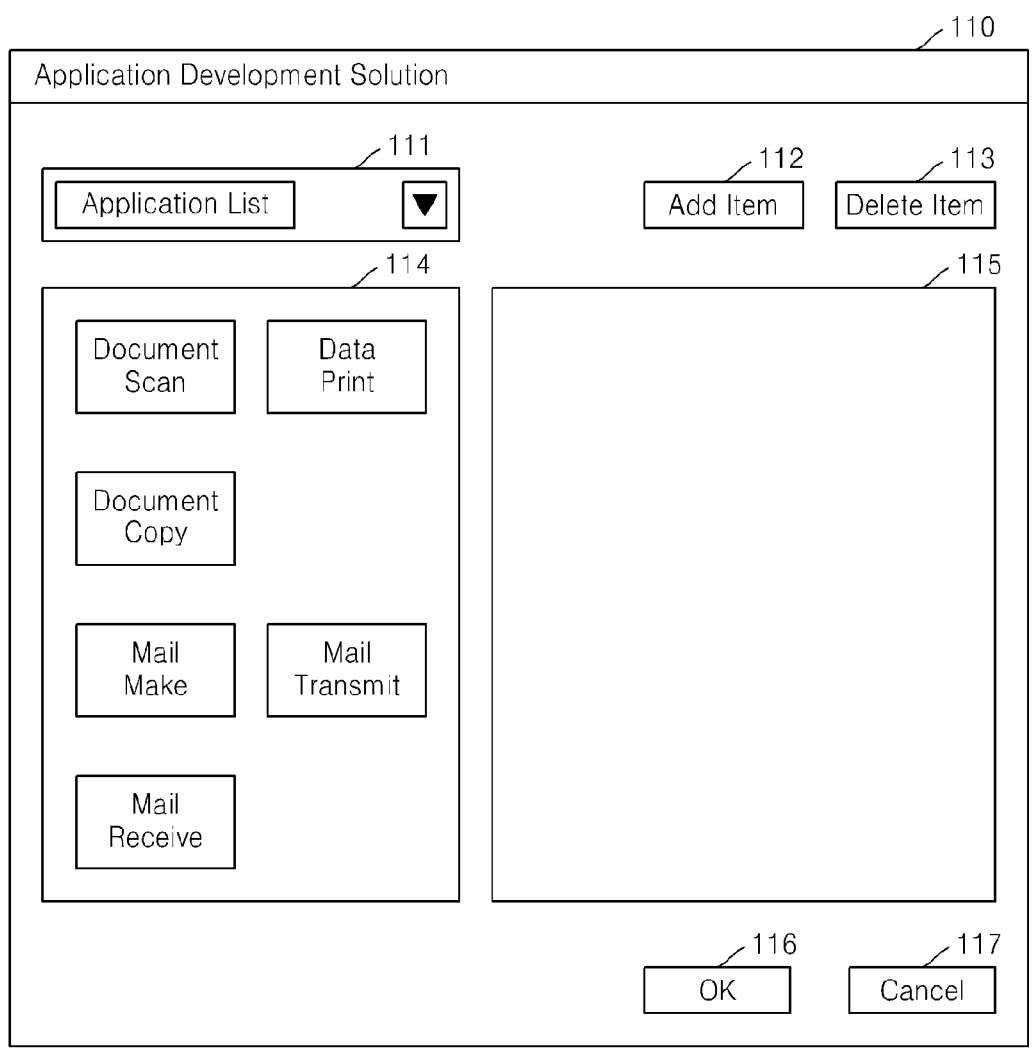
FIG. 11 illustrates a window including graphic tools for developing an application of the printer, according to an embodiment of the present general inventive concept.

FIG. 11 illustrates a window 110 including graphic tools for developing an application of the printer 100, according to an embodiment of the present general inventive concept. The window 110 shown in FIG. 11 may include a module area 114 in which icons indicating modules respectively describing functions of the printer 100 are displayed, a work area 115 to generate an application corresponding to a combination of modules by combining corresponding icons, and other tools. As shown in FIG. 11, examples of the other tools in the upper side of the window 110 are an "Application List" box 111 in which a list of applications is displayed, an "Add Item" button 112 to add a new application to the application list, and a "Delete Item" button 113 to delete an existing application from the application list. Other examples of the other tools in the lower side of the window 110 are an "OK" button 116, to complete generation of an application, and a "Cancel" button 117 to cancel an application generation work.

As shown in FIG. 11, examples of the icons displayed in the module area 114 are an icon of a "Document Scan" module to describe a function of scanning a document put into the printer 100, an icon of a "Data Print" module to describe a function of printing data, e.g., text and images, stored in the printer 100, and an icon of a "Document Copy" module to describe a function of copying a document put into the printer 100 by scanning and printing the document.

Other examples of the icons displayed in the module area 114 are an icon of a "Mail Make" module to describe a function of making an e-mail including data, e.g., text and images, stored in the printer 100, an icon of a "Mail Transmit" module to describe a function of transmitting an e-mail to an e-mail address of at least one user predetermined from among users of the printer 100, and an icon of a "Mail Receive" module to describe a function of detecting an e-mail received through an e-mail address of at least one user predetermined from among users of the printer 100.

Since icons are generally displayed having a specific shape, such as a same sized rectangle or circle, it is limited to display information regarding a module corresponding to an icon on the icon. Thus, when a certain icon is double clicked by a user, detailed information or additional information of a module corresponding to this icon may be separately displayed in a form of a balloon around the icon. Alternatively, when a certain icon is double clicked by the user, detailed information of a module corresponding to this icon may be displayed in a specific area of the window 110 instead of around the icon. For example, when the icon of the "Mail Transmit" module for performing the function of transmitting an e-mail to an e-mail address of at least one user predetermined from among users of the printer 100 is double clicked, e-mail addresses of users registered in the address book of the printer 100 may be displayed in a form of a balloon.

An application developer of the printer 100, i.e., a user of the host 200, may generate an application by moving icons displayed in the module area 114 to the work area 115 in a clicking state, arranging the moved icons in an order desired by the user, and clicking the "OK" button 116. An arrangement order of icons in the work area 115 of the window 110 shown in FIG. 11 indicates a data input/output relationship between modules corresponding to the icons. For example, a data input/output relationship between modules corresponding to icons may be defined as follows. If an icon B is located on the left of or above an icon A, data output from a module corresponding to the icon B is input to a module corresponding to the icon A, and if an icon C is located on the right of or below the icon A, data output from the module corresponding to the icon A is input to a module corresponding to the icon C. Arrows indicating the data input/output relationship may be displayed between the icons so that the user can easily identify the data input/output relationship between the modules corresponding to the icons.

Figure 12:
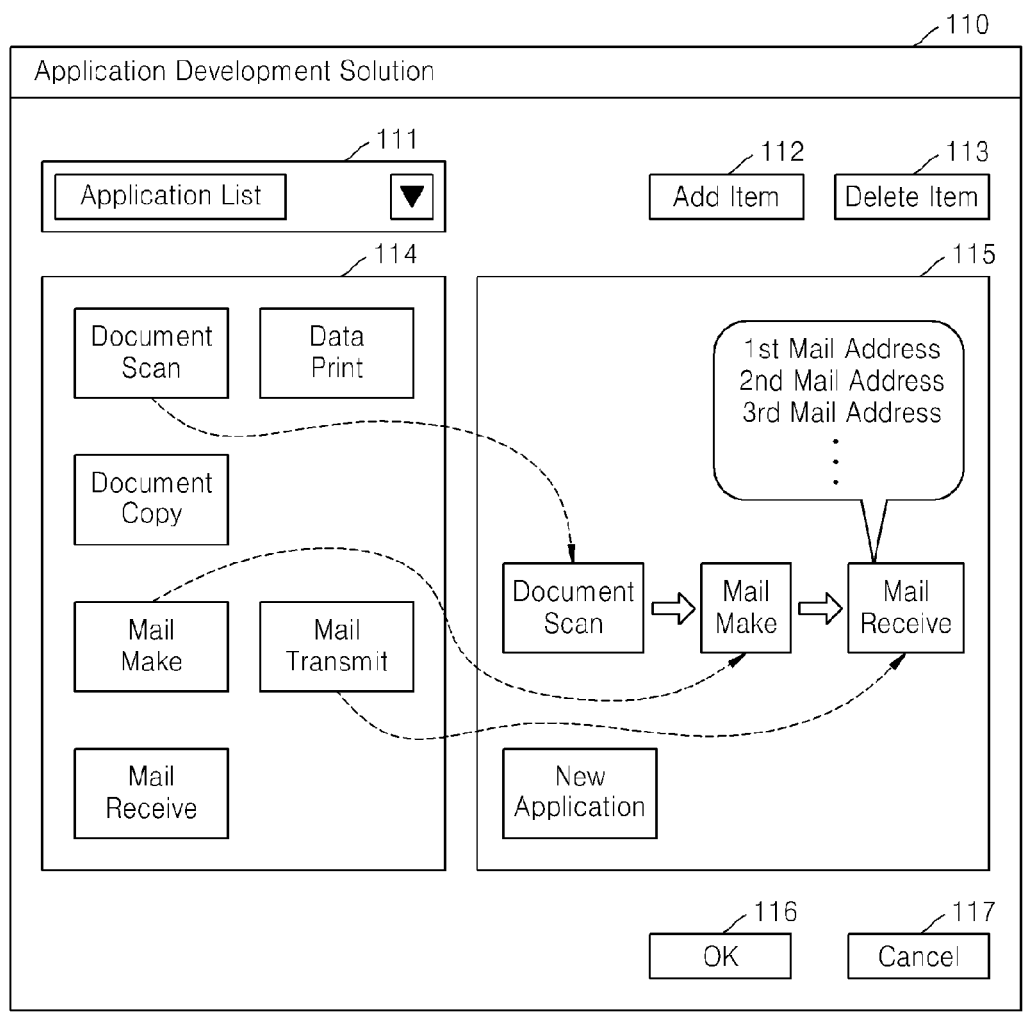
FIG. 12 illustrates an example of developing an application by using the graphic tools of the window shown in FIG. 11.

FIG. 12 shows an example of developing an application by using the graphic tools of the window 110 shown in FIG. 11. The example shown in FIG. 12 corresponds to a case of developing an application for scanning a document put into the printer 100 and automatically transmitting the scanned document to predetermined users from among users registered in the address book of the printer 100. When an application developer of the printer 100, i.e., a user of the host 200, clicks an icon indicating the application development solution of the printer 100 on the screen of the host 200, the application development solution is executed, thereby displaying the window 110 shown in FIG. 11 on the screen of the host 200.

Thereafter, to generate the application for performing the functions described above, the user of the host 200 moves the icon of the "Document Scan" module, the icon of the "Mail Make" module, and the icon of the "Mail Transmit" module to the work area 115, arranges them, and clicks the "OK" button 116. In more detail, as shown in FIG. 12, the user of the host 200 disposes the icon of the "Mail Make" module on the right of the icon of the "Document Scan" module so as to make an e-mail including a scanned image of the document put into the printer 100. Accordingly, the scanned image of the document output from the "Document Scan" module is input to the "Mail Make" module, and the "Mail Make" module makes the e-mail including the scanned image of the document. In addition, the user of the host 200 disposes the icon of the "Mail Transmit" module on the right of the icon of the "Mail Make" module so as to transmit the e-mail including the scanned image of the document put into the printer 100 to an e-mail address of at least one user designated by the user of the host 200 from among users registered in the address book of the printer 100. If the user of the host 200 double clicks the "Mail Transmit" module, e-mail addresses of the users registered in the address book of the printer 100 are displayed. Thereafter, the user of the host 200 may select at least one e-mail address corresponding to a destination of the e-mail by clicking at least one of the e-mail addresses. Accordingly, the e-mail output from the "Mail Make" module is input to the "Mail Transmit" module, and the "Mail Transmit" module transmits the e-mail to the at least one e-mail address selected by the user.

Thereafter, the user of the host 200 clicks the "OK" button 116 to complete the generation of the application for performing the functions described above and displaying a new application in the work area 115 of the window 110. If the user of the host 200 double clicks the application displayed in the work area 115 of the window 110, a box for inputting a name of the application may be generated so as for the user of the host 200 to input the name of the application in the box. For example, if users selected by the user of the host 200 belong to a group A, a name "group A document transmission" may be input. Thereafter, the user of the host 200 may add the new application to the application list by clicking the "Add Item" button 112. If the new application is added to the application list, the new application is displayed on the UI panel 160 of the printer 100. The user of the printer 100 may execute the new application through the UI panel 160 of the printer 100.

For example, the UI panel 160 of the printer 100 may be implemented with a touch screen, wherein the user may execute the new application by touching the new application on the touch screen with a finger. Only if the user of the printer 100 puts a certain document into the printer 100 and touches the new application displayed on the UI panel 160 of the printer 100, then a copy of the document is automatically transmitted to the pre-designated users.

Figure 13:
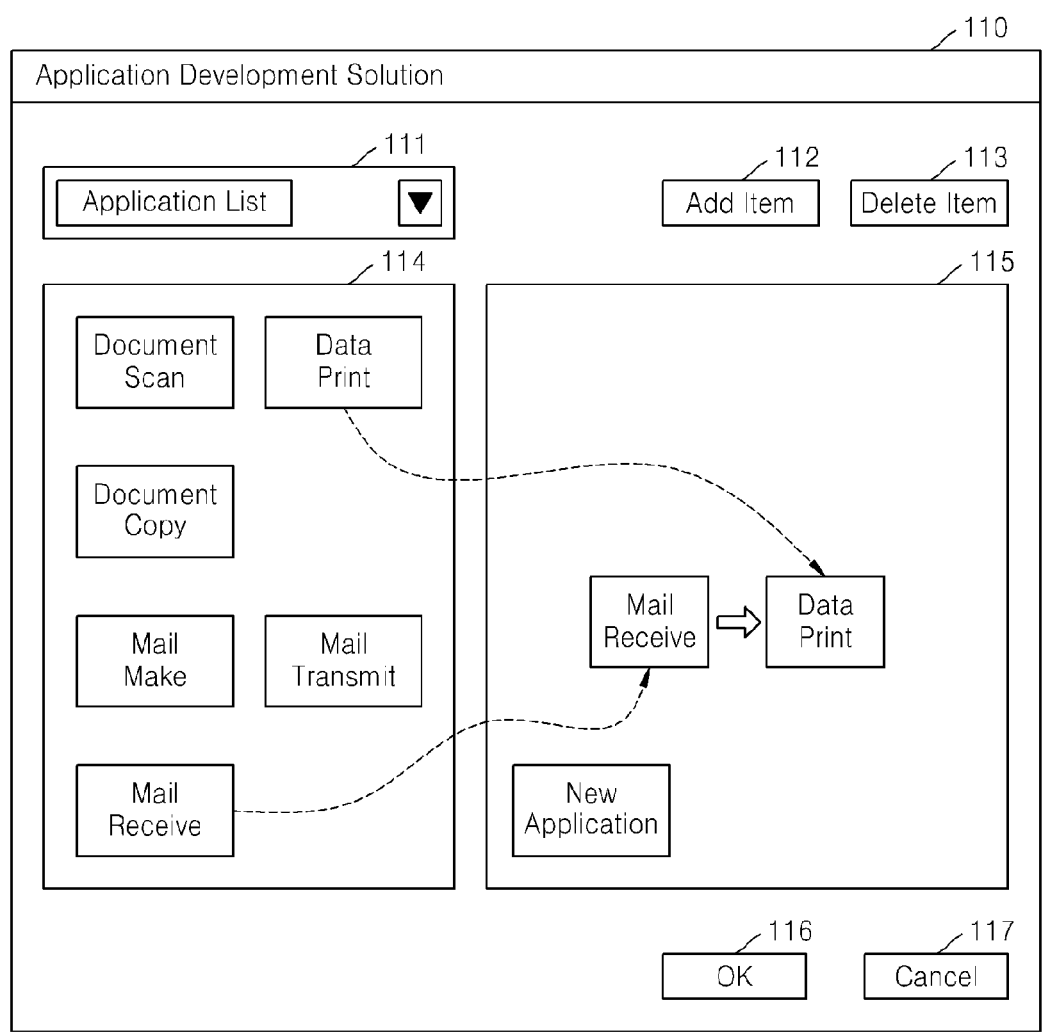
FIG. 13 illustrates another example of developing an application by using the graphic tools of the window shown in FIG. 11.

FIG. 13 shows another example of developing an application by using the graphic tools of the window 110 shown in FIG. 11. The example shown in FIG. 13 corresponds to a case of developing an application for automatically printing an e-mail when the e-mail is received to the printer 100 through a predefined e-mail address. Since the descriptions of executing the application development solution of the printer 100 and adding a completed application for application development are the same as those in the example shown in FIG. 12, only a process of generating an application in the work area 115 of the window 110 will be described hereinafter.

To generate the application for performing the function described above, the user of the host 200 moves the icon of the "Mail Receive" module and the icon of the "Data Print" module to the work area 115, arranges them, and clicks the "OK" button 116. In more detail, as shown in FIG. 13, the user of the host 200 disposes the icon of the "Data Print" module on the right of the icon of the "Mail Receive" module so as to print the e-mail received by the printer 100 through the pre-defined e-mail address. Accordingly, the e-mail output from the "Mail Receive" module is input to the "Data Print" module, and the "Data Print" module prints the e-mail.

The application development examples shown in FIGS. 11 to 13 may also be applied to the application development apparatus shown in FIG. 5 and the application developing method shown in FIG. 9. For example, the window 110 may include an API area in which icons indicating API functions, to describe functions of the printer 100, are displayed instead of having the module area 114 in which icons indicating modules for describing the functions of the printer 100 are displayed. Since such developed applications can be executed in other types of products using the same processor or firmware as that of the printer 100, applications secured in the printer 100 may be shared with other types of products by using Digital Living Network Alliance (DLNA) technology.

According to the above-described embodiments, the application development solution may be stored in the printer 100, and an application developed by using the application development solution may be directly stored in the printer 100, so the processes of uploading and downloading the application are unnecessary. In addition, since a user can develop an application by combining functions of the printer 100, which are displayed in graphic form, an environment may be provided in which general users, who lack computer knowledge, can easily develop an application. In addition, by generating an application by combining modules that are previously cross-compiled binary files or compiling the application by using a cross compiler stored in the printer 100, the host 200 does not have to install any cross compiler or emulator, and an environment may be provided in which general users, who lack computer knowledge, can easily develop an application. Accordingly, user requirements of the printer 100 can be immediately satisfied.

The application developing method and the application executing method can be written as computer programs and can be implemented in general-use digital computers that execute the programs using a computer-readable recording medium. Examples of the computer-readable recording medium include storage media such as magnetic storage media (e.g., ROM, floppy disks, hard disks, etc.) and optical recording media (e.g., CD-ROMs, or DVDs).

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of developing an application of a multi-function printer (MFP) by using a hierarchical structure of data blocks recorded in the MFP, the method comprising:
    executing a solution included in a solution block that is stored in the MFP, the solution providing tools to develop the application of the MFP;
    displaying, by the MFP, native functions, included in a firmware block, of the MFP according to the execution of the solution such that the displayed native functions include at least one of functions for printing a document, functions for copying a document, and functions for scanning a document;
    automatically generating, by the MFP, an application corresponding to input information of a user by combining the native functions based on the input information;
    storing the generated application in the MFP,
    wherein
    the displaying comprises displaying modules describing the native functions of the MFP corresponding to combinations of some application programming interface (API) functions stored in the MFP,
    the generating comprises generating the application corresponding to the input information by combining some of the displayed modules based on the input information, and
    each of the modules describes a function of the MFP corresponding to a combination of some API functions of the MFP with native functions in the MFP by using the combination.

2. The method of claim 1, wherein the displaying comprises displaying API functions describing the native functions of the MFP, and
    the generating comprises generating the application corresponding to the input information by combining some of the displayed API functions based on the input information.

3. The method of claim 2, further comprising generating an application having codes executable in the MFP by cross compiling the generated application.

4. The method of claim 1, further comprising recognizing, by a host connected to the MFP, a storage of the MFP,
    wherein the executing the solution comprises reading, by the host, the solution from the storage of the MFP and executing the solution.

5. The method of claim 4, wherein the storage of the MFP and the host are connected to each other via a universal serial bus (USB), and
    the recognizing comprises recognizing the storage of the MFP through a Mass Storage Class (MSC) protocol of the USB.

6. The method of claim 4, wherein the storage of the MFP and the host are connected to each other via a network, and
    the recognizing comprises recognizing the storage of the MFP through a Server Message Block (SMB) protocol of the network.

7. A multi-function printer (MFP), comprising:
    hardware elements having a plurality of native functions including at least one of functions for printing a document, functions for copying a document, and functions for scanning a document, by the MFP;
    a storage to store a solution in a solution block, the solution providing tools to develop an application of the MFP and at least one application developed by using the solution; and
    a processor to control operations of the hardware elements according to the solution by executing the solution stored in the storage,
    wherein
    the at least one application is automatically generated, by the MFP, by combining native functions of the MFP displayed according to the execution of the solution,
    the storage further stores application programming interface (API) functions of the MFP and modules describing the functions of the MFP with native functions in the MFP by using combinations of some of the API functions, and
    the processor executes an application generated from a combination of some of the modules.

8. The MFP of claim 7, wherein the storage further stores API functions of the MFP and a cross compiler to translate an application of the MFP into codes executable in the MFP, and
    the processor compiles an application generated from a combination of some of the API functions by executing the cross compiler and executes the compiled application.

9. The MFP of claim 7, wherein the hardware elements comprises a communication unit having a function of connecting the storage to a host so that the storage can be recognized by the host, and
    the solution stored in the storage is read by the host via the communication unit and executed by the host.

10. The MFP of claim 9, wherein the communication unit connects the storage to the host by using a Mass Storage Class (MSC) protocol of a universal serial bus (USB), and
    the storage is recognized by the host through the MSC protocol.

11. The MFP of claim 9, wherein the communication unit connects the storage to the host by using a Server Message Block (SMB) protocol of a network, and
    the storage is recognized by the host through the SMB protocol.

12. A non-transitory recording medium of a multi-function printer (MFP) on which data blocks in a hierarchical structure are recorded, the data blocks comprising:
    a firmware block corresponding to firmware including native functions of the MFP, the native functions including at least one of functions for printing a document, functions for copying a document, and functions for scanning a document;
    a wrapper block corresponding to a set of wrapper functions connecting the native functions to application programming interface (API) functions of the MFP;

an API block corresponding to a set of the API functions of the MFP and to store information about the API functions of the MFP; and a solution block corresponding to a solution providing tools for automatically developing, by the MFP, an application of the MFP in accordance with input information of a user, wherein the firmware block, wrapper block, API block, and solution block are recorded in the non-transitory recording medium located in the MFP, the data blocks further comprise modules describing functions of the MFP corresponding to a combination of some of the API functions of the MFP with native functions in the MFP by using the combination, and the input information of the user corresponds to a combination of some of the modules stored in the MFP.

13. A method of developing an application of a multi-function printer (MFP) by using a hierarchical structure of data blocks recorded in the MFP, the method comprising:

executing a solution included in a solution block stored in the MFP, the solution providing tools to develop the application of the MFP;

displaying, by the MFP, native functions, included in a firmware block, of the MFP such that the displayed native functions include at least one of functions for printing a document, functions for copying a document, and functions for scanning a document;

combining the displayed native functions in accordance with information input by a user;

automatically generating, by the MFP, the application in accordance with the input information, wherein the displaying comprises displaying modules describing the native functions of the MFP corresponding to combinations of some application programming interface (API) functions stored in the MFP, the generating comprises generating the application corresponding to the input information by combining some of the displayed modules based on the input information, and each of the modules describes a function of the MFP corresponding to a combination of some API functions of the MFP with native functions in the MFP by using the combination.

14. The method according to claim 13, further comprising:

setting an environment of the MFP required to develop an application by securing a memory space of a storage of the MFP; and storing the generated application in the storage.

15. A multi-function printer (MFP), comprising:

hardware elements including at least one of native functions for printing a document, functions for copying a document, and functions for scanning a document, by the MFP;

a storage to store a solution in a solution block, the solution providing tools to develop an application; and a processor to control operations of the hardware elements according to the solution stored in the storage, the application being automatically generated, by the MFP, by combining native functions arranged in accordance with information input by a user, the generated application being stored in the storage, wherein the storage further stores application programming interface (API) functions of the MFP and modules describing the functions of the MFP with native functions in the MFP by using combinations of some of the API functions, and the processor executes an application generated from a combination of some of the modules.

16. The MFP according to claim 15, wherein the tools are describable with binary codes executable in an operating system of a host, and the solution is executed by any one of the host or the MFP.

* * * * *